(12) United States Patent
Oikarinen (10) Patent No.: US 9,898,020 B2
(45) Date of Patent: Feb. 20, 2018

(54) POWER SUPPLY VOLTAGE PRIORITY BASED AUTO DE-RATING FOR POWER CONCURRENCY MANAGEMENT

(71) Applicant: QUALCOMM Incorporated, San Diego, CA (US)

(72) Inventor: Juha Oikarinen, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/157,272

(22) Filed: May 17, 2016

(65) Prior Publication Data

US 2017/0255213 A1    Sep. 7, 2017

Related U.S. Application Data

(60) Provisional application No. 62/302,496, filed on Mar. 2, 2016.

(51) Int. Cl.
*G05F 1/56* (2006.01)
*G06F 1/26* (2006.01)

(52) U.S. Cl.
CPC . *G05F 1/56* (2013.01); *G06F 1/26* (2013.01)

(58) Field of Classification Search
CPC ...................................... G05F 1/56; G06F 1/26
See application file for complete search history.

(56) References Cited

U.S. PATENT DOCUMENTS 7,609,047 B2 * 10/2009 Ravichandran ........... G06F 1/26
                                                            323/277
8,026,636 B2    9/2011 Oh
(Continued)

FOREIGN PATENT DOCUMENTS

CN      101672872 B    10/2011
EP         2568568 A1    3/2013

OTHER PUBLICATIONS

Bindra V.A., "Combining a Switching Converter with Multiple LDOs in the Same Package Increases Design Options," Digi-Key Electronics, Apr. 15, 2014, URL: http://www.digikey.de/de/articles/techzone/2014/apr/combiningaswitchingconverterwithmultipleldosinthesamepackageincreasesdesignoptions, Retrieved dated on Nov. 25, 2015, 3 pages.

(Continued)

*Primary Examiner* — Emily P Pham (74) *Attorney, Agent, or Firm* — Haynes and Boone, LLP (57) ABSTRACT

Particular embodiments include logic that can reduce an voltage output of a regulator to multiple subsystems in response to detecting high power conditions in an electronic device. When the power being monitored goes up, the logic detects the increase in power. Then, the logic can compare the power to a plurality of thresholds. The plurality of thresholds may be set below an absolute limit threshold in which the electronic device may not operate properly if the absolute limit is met. When a first threshold is met, the output voltage of the regulator may be decreased until a minimum voltage level is reached. When a second threshold is met, the output voltage may be increased until a maximum voltage level is reached. The minimum and maximum voltage levels may be based on voltage levels requested from a set of subsystems and also priority levels associated with those subsystems.

19 Claims, 6 Drawing Sheets

(56) References Cited

U.S. PATENT DOCUMENTS

| | | | | |
|---|---|---|---|---|
| 8,897,924 B2* | 11/2014 | Nilsen | ............ | H02J 3/14 |
| | | | | 307/29 |
| 8,912,771 B2* | 12/2014 | Humphrey | ............ | G06F 1/26 |
| | | | | 323/267 |
| 2004/0130302 A1* | 7/2004 | Ostojic | ............ | H02J 1/08 |
| | | | | 323/272 |
| 2008/0052551 A1* | 2/2008 | Chapuis | ............ | G06F 1/26 |
| | | | | 713/340 |
| 2009/0179487 A1* | 7/2009 | Liu | ............ | H02J 1/08 |
| | | | | 307/31 |
| 2009/0278506 A1* | 11/2009 | Winger | ............ | H02J 7/0068 |
| | | | | 320/160 |
| 2012/0075005 A1 | 3/2012 | Flores et al. | | |
| 2013/0159734 A1 | 6/2013 | Pan | | |
| 2014/0015507 A1* | 1/2014 | Park | ............ | H04B 1/1607 |
| | | | | 323/304 |
| 2015/0263615 A1* | 9/2015 | Moon | ............ | H02M 3/158 |
| | | | | 323/266 |
| 2015/0268678 A1 | 9/2015 | Yu et al. | | |
| 2016/0109923 A1* | 4/2016 | Chen | ............ | G06F 1/3296 |
| | | | | 713/322 |

OTHER PUBLICATIONS

NCP6914: "5 Channel PMIC: 1 DCDC Converter and 4 LDOs," Publication Order No. NCP6914/D, Semiconductor Components Industries, LLC, Apr. 2014—Rev. 10, pp. 1-36.
Written Opinion—PCT/US2017/01658—ISA/EPO—Apr. 8, 2017.
International Search Report—PCT/US2017/016588—ISA/EPO—Apr. 8, 2017.

* cited by examiner

POWER SUPPLY VOLTAGE PRIORITY BASED AUTO DE-RATING FOR POWER CONCURRENCY MANAGEMENT

CROSS REFERENCE TO RELATED APPLICATIONS

The present disclosure claims priority to U.S. Provisional App. No. 62/302,496, entitled "POWER SUPPLY VOLTAGE PRIORITY BASED AUTO DE-RATING FOR POWER CONCURRENCY MANAGEMENT", filed Mar. 2, 2016, the contents of which is incorporated herein by reference in its entirety.

BACKGROUND

The disclosure relates to regulators, and in particular, to power management for a regulator.

Unless otherwise indicated herein, the approaches described in this section are not admitted to be prior art by inclusion in this section.

A regulator may provide a voltage rail from a battery. Regulators increasingly have to service multiple subsystems (e.g., loads) in electronic devices. These subsystems may have different power supply voltage requirements and load current requirements. However, the power delivery capability of the regulator is limited by the power available from the battery. Under certain conditions, the regulator may not be able to provide sufficient power to meet all the demands of all the subsystems. When load currents of multiple subsystems increase, the power supply voltage at the output of the regulator (Vout) may droop, causing one or more subsystems to fail.

SUMMARY

In one embodiment, a system includes a regulator configured to receive an input voltage and output an output voltage to a plurality of subsystems. The plurality of subsystems comprise at least one first subsystem with a first priority level and at least one second subsystem with a second priority level. The system also includes sensor logic configured to: monitor power of the system; generate a minimum output voltage level from the regulator based at least in part on minimum operating voltages of the first set of subsystems of the first priority level; compare the power to a threshold; and decrease the output voltage of the regulator based at least in part on the power meeting the threshold, wherein the output voltage is not decreased to be lower than the minimum output voltage level.

In one embodiment, a method of generating regulated voltages in a system including a regulator includes: receiving an input voltage and outputting an output voltage to a plurality of subsystems, wherein the plurality of subsystems comprise at least one first subsystem with a first priority level and at least one second subsystem with a second priority level; monitoring power of the system; generating a minimum output voltage level from the regulator based at least in part on minimum operating voltages of the first set of subsystems of the first priority level; comparing the power to a threshold; and decreasing the output voltage of the regulator based at least in part on the power meeting the threshold, wherein the output voltage is not decreased to be lower than the minimum output voltage level.

In one embodiment, a system includes: means for receiving an input voltage and output an output voltage to a plurality of subsystems, wherein the plurality of subsystems comprise at least one first subsystem with a first priority level and at least one second subsystem with a second priority level; means for monitoring power of the system; means for generating a minimum output voltage level from a regulator based at least in part on minimum operating voltages of the first set of subsystems of the first priority level; means for comparing the power to a threshold; and means for decreasing the output voltage of the regulator based at least in part on the power meeting the threshold, wherein the output voltage is not decreased to be lower than the minimum output voltage level.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Particular embodiments include logic that can incrementally reduce (e.g., de-rate) a power supply voltage output (Vout) of a regulator to multiple subsystems in response to detecting high power conditions in an electronic device. When the power being monitored in the electronic device goes up, the logic detects the increase in power. Then, the logic can compare the power to a plurality of thresholds. The plurality of thresholds may be set below an absolute limit threshold in which the electronic device may not operate properly if the absolute limit is met. When a first threshold is met, the output voltage of the regulator may be incrementally decreased until a minimum voltage level is reached.

When a second threshold is met, the output voltage may be incrementally increased until a maximum voltage level is reached. The minimum and maximum voltage levels may be based on minimum operating voltages from a set of subsystems and also priority levels associated with those subsystems. The minimum operating voltages may be voltages that subsystems require to operate, levels that are set based on system requirements, or desired levels. The priority levels may be used to define the minimum voltage where a first level is a maximum of all minimum operating voltages that are required of all subsystems and a second level is a maximum of minimum operating voltages that are required of certain higher priority subsystems. When all subsystems are discussed, this includes subsystems that are being monitored and may not mean all subsystems in the device, all subsystems on the chip, and all subsystems off the chip. A priority level is based on a priority that is assigned to a subsystem. The priority levels are used to define the first level and second level of output voltages from the regulator. The thresholds are used in the power comparison to determine when to increase or decrease the voltage level. The thresholds may be based on a first threshold at a power value in which the device may start to fail, a second threshold that is set below the first threshold such that early detection of high power values can be detected, and a third threshold where a power value is considered low. It is noted that not all of these thresholds may be used or needed, and other or additional thresholds may be used.

Figure 1:
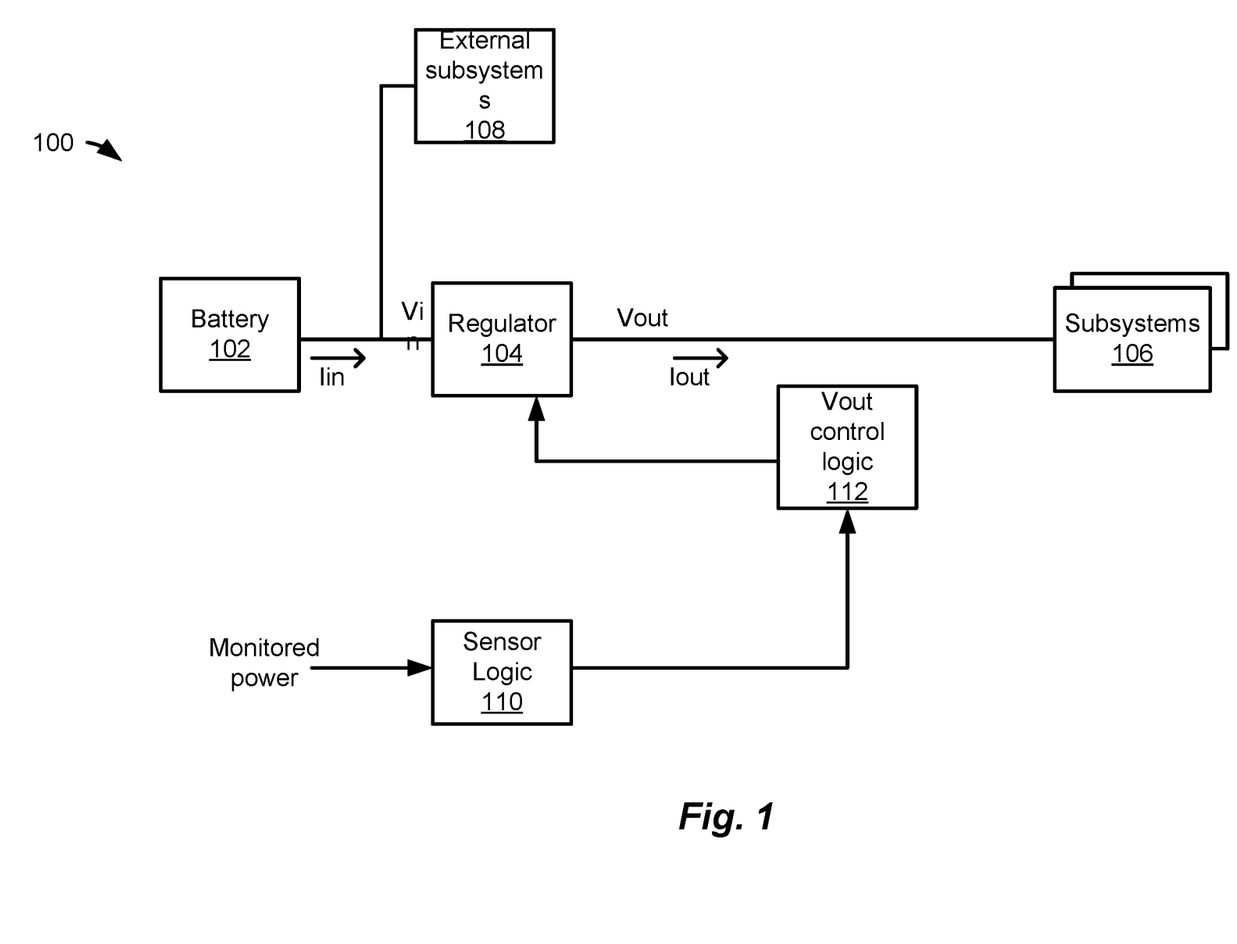
FIG. 1 depicts a simplified system for delivering power in an electronic device according to one embodiment.

FIG. 1 depicts a simplified system 100 for delivering power in an electronic device according to one embodiment. System 100 includes a battery 102 that may provide a power supply voltage from outside a chip including a regulator 104. Regulator 104 may deliver a power supply voltage (e.g., a voltage rail) from battery 102 to different subsystems 106. Also, other subsystems 108 may be located external to the chip that includes regulator 104. Subsystems 108 may not draw power from regulator 104, but may still draw power from battery 102. Subsystems 108 may also be on chip, but not draw power from regulator 104. Also, subsystems 106 may be on the same chip as regulator 104, off chip, or a combination of on and off chip. However, these subsystems 106 draw power from regulator 104.

System 100 may be part of an electronic device, such as a cellular phone, tablet, or other mobile device. In one embodiment, regulator 104 is highly integrated in the electronic device with subsystems 106 and subsystems 108. In one embodiment, regulator 104 may be a buck regulator, a boost regulator, and/or a buck boost regulator. Regulator 104 regulates the output voltage Vout from regulator 104 to different subsystems 106. For example, in boost mode, regulator 104 is capable of providing an output voltage Vout greater than an input voltage Vin that is received from battery 102. Also, in buck mode, regulator 104 may step down the level of the output voltage Vout from the input voltage Vin that is received from battery 102.

System 100 includes various subsystems 106 (e.g., loads) that draw power from regulator 104. These subsystems 106 may include different minimum power supply voltage specifications. For example, the minimum operating voltage may be a level below which the subsystems may no longer operate properly. The minimum operating voltage may also be set at a desired value and be above or below the level in which the subsystems may no longer operate properly. Subsystems 106 may draw different levels of power (e.g., current and/or voltage) at different times depending on the operations the subsystems are performing. Further, different subsystems may draw power at different times, such as a subsystem may draw power when actively performing an operation, but not draw a lot of power when not idle. For example, an electric flash on a camera may draw a large current for a short time when the flash is operated, a WiFi or cellular subsystem may draw a large current during transmission, or a computer processor may draw a large current while processing a large instruction block.

In a highly-integrated system, such as a mobile phone or tablet computer, the power delivery capability of regulator 104 is limited by the power available from battery 102. Under certain conditions, regulator 104 may not be able to provide sufficient power to meet all the demands of subsystems 106. When the power required for multiple subsystems increases past the available power, the power supply voltage at the output of regulator 104 may droop, causing one or more subsystems 106 to fail.

Particular embodiments provide sensor logic 110 and Vout control logic 112 to adjust the output voltage Vout such that regulator 104 is able to provide sufficient power to subsystems 106. In one embodiment, sensor logic 110 and Vout control logic may be part of regulator 104. As will be discussed in more detail below, sensor logic 110 monitors power in the electronic device and uses multiple thresholds to determine when to increase or decrease the output voltage Vout of regulator 104. The thresholds may be set below an absolute limit threshold in which the electronic device may not operate properly if the absolute limit is met. These thresholds are compared to the power to determine when the power may be above or below the threshold. These thresholds are different from the voltage levels that are based on the output voltage of regulator 104. That is, the output voltage of regulator 104 should be operating at certain levels based on operating voltage requirements of the subsystems. The power that is monitored may be different from the output voltage of regulator 104. Vout control logic 112 controls the output voltage Vout by increasing or decreasing the output voltage. The increase or decrease may be in increments, which increases or decreases the output voltage by a certain amount (e.g., increment) each time a condition occurs. The increase or decrease may also be continuous, such as the output voltage is increased or decreased continuously until a condition is reached to stop the increasing or decreasing. The output voltage Vout may only be decreased to the minimum voltage level or increased to a maximum voltage level. These levels are based on voltage levels requested from a set of subsystems and priority levels associated with those subsystems. These concepts will now be described in more detail.

Figure 2:
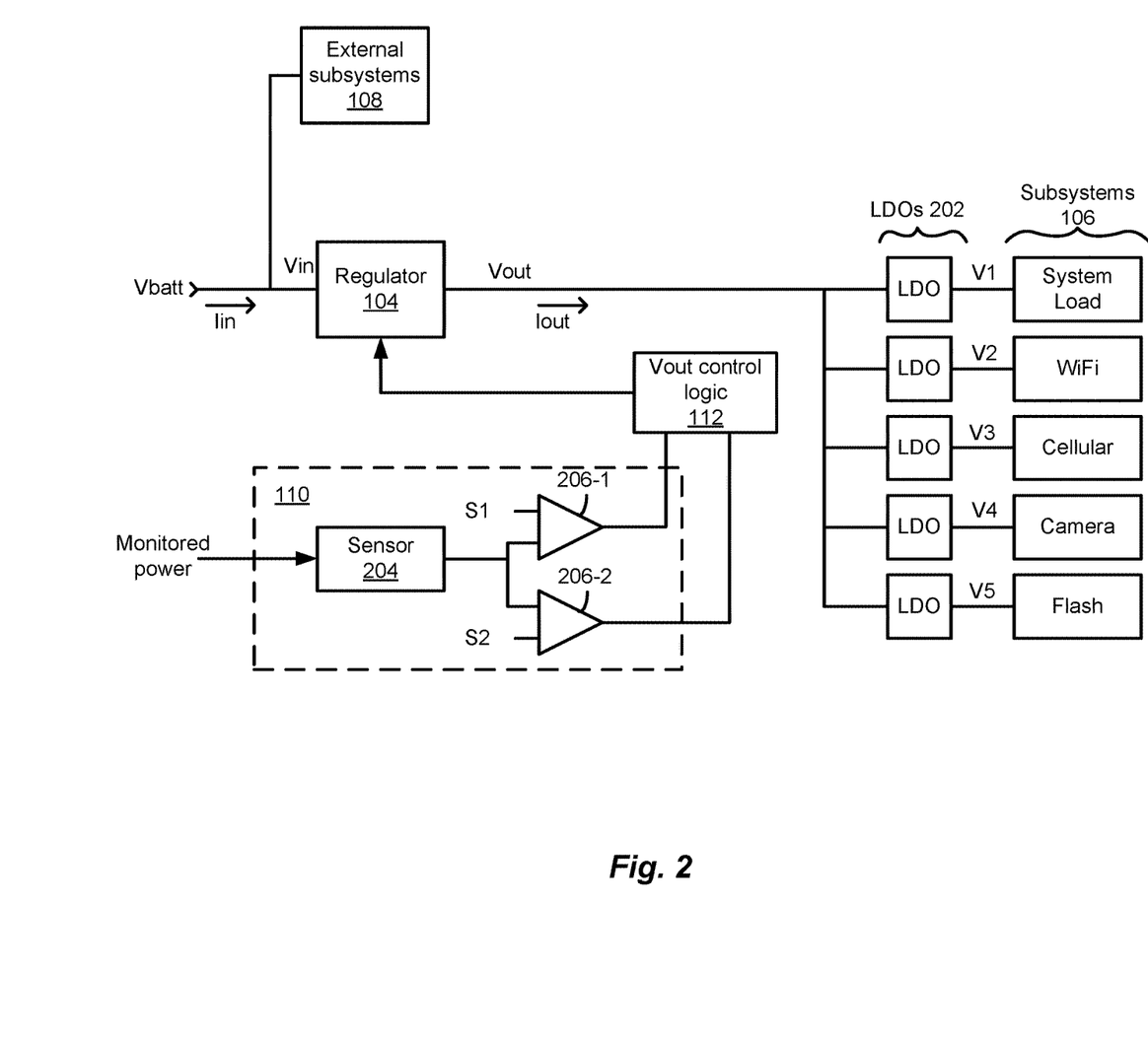
FIG. 2 depicts a more detailed example of the system according to one embodiment.

FIG. 2 depicts a more detailed example of system 100 according to one embodiment. In this example, an implementation of sensor logic 110 is shown, but it will be recognized that other implementations will be appreciated. For example, sensor logic 110 may be implemented in analog circuits, digital circuits, and/or software.

Regulator 104 receives a battery voltage Vbatt (or current Iin) from battery 102, and provides an output voltage Vout (or current Iout) to low drop-out (LDO) regulators 202 that customize the internal power supply voltage to each subsystem 106. For example, a system load may require a voltage V1, a WiFi subsystem may require a voltage V2, a cellular subsystem may require a voltage V3, a camera subsystem may require a voltage V4, and a flash subsystem may require a voltage V5. These voltages may be the minimum voltage required for the subsystems to operate properly or be any desired voltages. For example, if the output voltage goes below this level, a subsystem may experience decreased performance. However, in some cases, the subsystem may not experience a total failure.

Each of these subsystems may be assigned a priority from multiple different priorities. For example, a first higher priority is defined as a "priority level 1" and a second lower priority is defined as a "priority level 0". The minimum and maximum output voltage Vout levels of regulator 104 are generated based on the priorities and the power supply voltages being requested by subsystems 106. For example, a minimum allowable Vout level is defined by the requested power supply voltages of subsystems 106 that are designated as "priority level 1". In one example, the WiFi subsystem may require 3.6V to operate properly, but other subsystems 106, such as the system load, may require only 3.3V. WiFi may be designated as a low priority load and assigned the priority level priority level 0 and the system load is designated as a high priority level 1. In this case, during high power loading, it may be acceptable to reduce the power supply output voltage Vout to be lower than 3.6V (the level needed by WiFi), but not less than 3.3V (the level needed by the system load). This reduced voltage may reduce the performance of WiFi subsystem, but the user impact might be minimal. In this case, as long as the power supply voltage is above 3.3V, the priority level 1 subsystems 106 may operate properly, but the WiFi subsystem may possibly operate at a reduced performance, but WiFi is considered a lower priority and the reduced performance is tolerated and may not noticeably impact a user of the electronic device. At the expense of a reduced performance of the WiFi subsystem, a shutdown of any subsystem or the entire electronic device may be avoided.

Sensor logic 110 includes a sensor 204 that monitors the power from one or more locations in the electronic device. The locations may be at the input of regulator 104, the output of regulator 104, within regulator 104, the output of battery 102, and the input of external subsystems 108, but are not limited to these locations. In one embodiment, sensor 204 monitors the input current through regulator 104, such as through an inductor of regulator 104. In other examples, either the current or the voltage being output by battery 102 or being input to external subsystems 108 may be monitored.

Comparison logic shown as a first comparator 206-1 and a second comparator 206-2 receive the monitored power and can compare the monitored power to different thresholds. For example, comparator 206-1 compares the power to a first threshold S1 and second comparator 206-2 compares the power to a second threshold S2. The first threshold S1 and the second threshold S2 may be early warning levels that control the automatic adjustment of the output voltage of regulator 104. A third absolute threshold Lim may be an absolute threshold in which the system may stop operating properly if the power goes above this limit. In this case, the electronic device or a subsystem may need to be shut down or other undesirable measures taken. In one example, the thresholds may be current thresholds if current is being monitored, such as the first threshold S1 is 3.5 A, the second threshold S2 is 3 A, and the absolute threshold Lim may be 4 A. Other thresholds may also be used, such as power or voltage thresholds. In the case of monitoring current, for example, the absolute threshold Lim is above the threshold S1, which is above the threshold S2. By providing the other thresholds S1 and S2, Vout control logic 112 may adjust the output voltage Vout of regulator 104 such that the threshold Lim may not be reached. This may avoid an undesirable shutdown of components of the electronic device.

When the monitored power meets the first threshold S1 (is equal to and/or above), comparator 206-1 outputs a signal, such as a "high" signal to Vout control logic 112. Also, when the monitored power meets the second threshold S2 (e.g., is equal to or below), comparator 206-2 outputs a high signal to Vout control logic 112. Conversely, when the power goes below the first threshold or above the second threshold, comparators 206-1 and 206-2, respectively, output a "low" signal to Vout control logic 112.

When threshold S1 is met, Vout control logic 112 may send a signal to regulator 104 to step the output voltage Vout down, such as by an increment or continuously down. When the threshold is met, the threshold may be crossed, be equal to, be in a neighborhood or be within a range of the threshold. The increment may be preset and may be around 32 millivolt (mV)/6 microseconds (us). When the threshold S2 is met, then Vout logic 112 may output a signal to regulator 104 to increase the output voltage, such as by an increment (e.g., by the same 32 mV/6 us increment) or by continuously increasing. It is noted that when an increment is used, continuously increasing or decreasing may be used also. Each time one of the thresholds is met, then Vout control logic 112 may signal regulator 104 to adjust the output voltage by another increment. In one embodiment, once the threshold is hit and goes above or below the threshold, the signal should be cleared before it can be met again. In other embodiments, at every clock cycle, the power is checked, and if one of the thresholds is met, the signal is asserted again.

Figure 3:
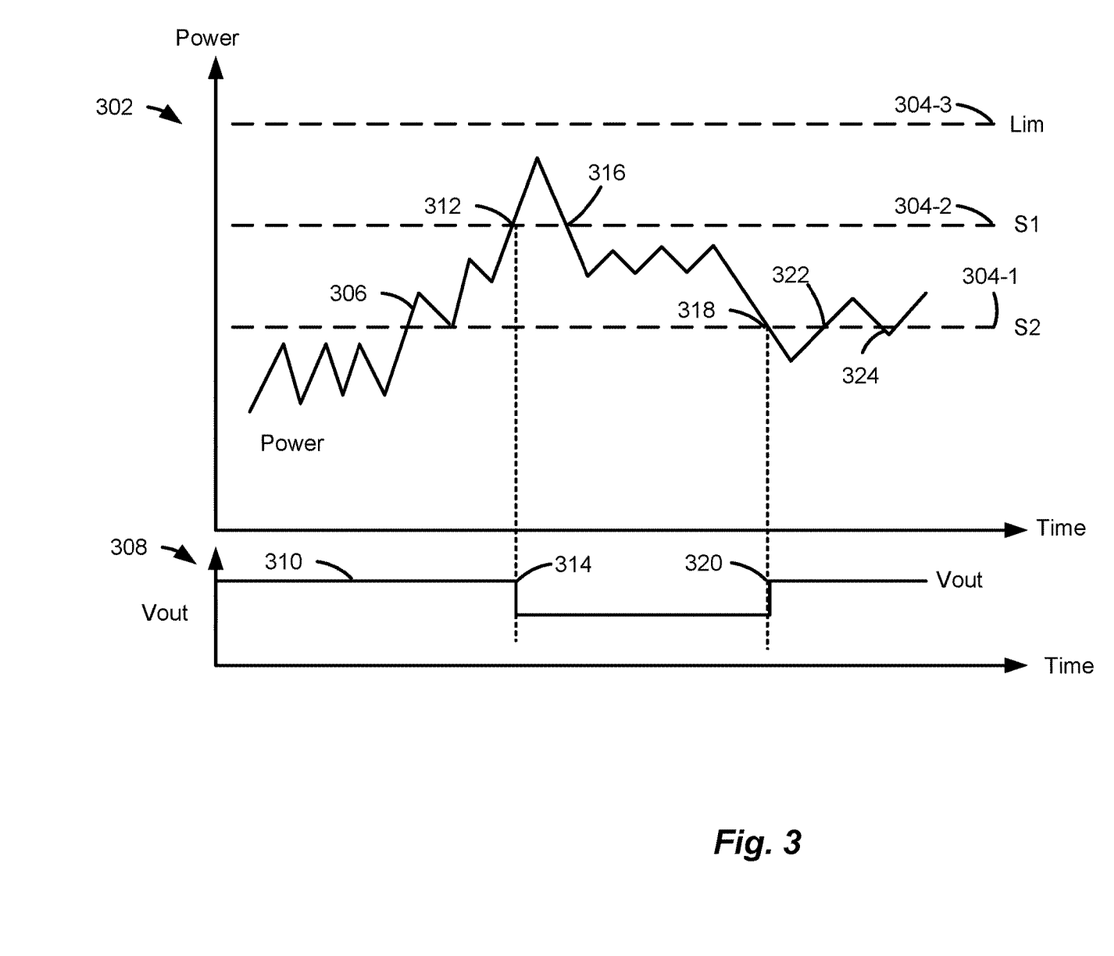
FIG. 3 depicts an example of the comparison by sensor logic according to one embodiment.

FIG. 3 depicts an example of the comparison by sensor logic 110 according to one embodiment. In a first graph 302, power vs. time is shown. Although power is described, it will be understood that current or voltage may be monitored rather than power. The three thresholds Lim, S1, and S2 are shown at 304-1, 304-2, and 304-3, respectively. The monitored power is shown at 306. A second graph 308 shows the output voltage Vout for regulator 104. A line 310 shows the value of the output voltage Vout.

At 306, the power over time may start increasing to a point shown at 312 where the threshold S1 is met. In this case, the power begins at a point lower than the threshold S1 and then meets the threshold S1. In one embodiment, either meeting the value of threshold S1 or going above the threshold S1 may be required. However, when meeting the threshold S1 is described, this will cover both situations. When the threshold S1 is met, as described above, comparator 206-1 may output a signal to Vout control logic 112 to reduce the output voltage of regulator 104. As shown at 314, the output voltage Vout is then reduced by an increment of 32 mV. This corresponds to the power crossing the threshold S1.

At 316, the power has gone below a threshold S1. However, the output voltage Vout is not increased when this occurs. In this case, the output voltage is not increased until the second threshold S2 is met. By not increasing the output voltage, hysteresis may be built in that the output voltage may not be increased and decreased and increased again multiple times when the power varies within a small range. However, in some embodiments, the input voltage may be increased when the power goes below the first threshold S1.

As shown in graph 302, the power from point 316 may decrease and eventually meet threshold S2 at 318. Meeting threshold S2 may mean being equal to threshold S2 or going below threshold S2. When this occurs, the output voltage Vout of regulator 104 is increased. This is shown at 320 in graph 308.

The power may then increase and go above threshold S2 at 322. The power may decrease again and meet threshold S2 at 324. However, the output voltage of regulator 104 is already at the maximum output voltage target and thus is not increased again.

Figure 4:
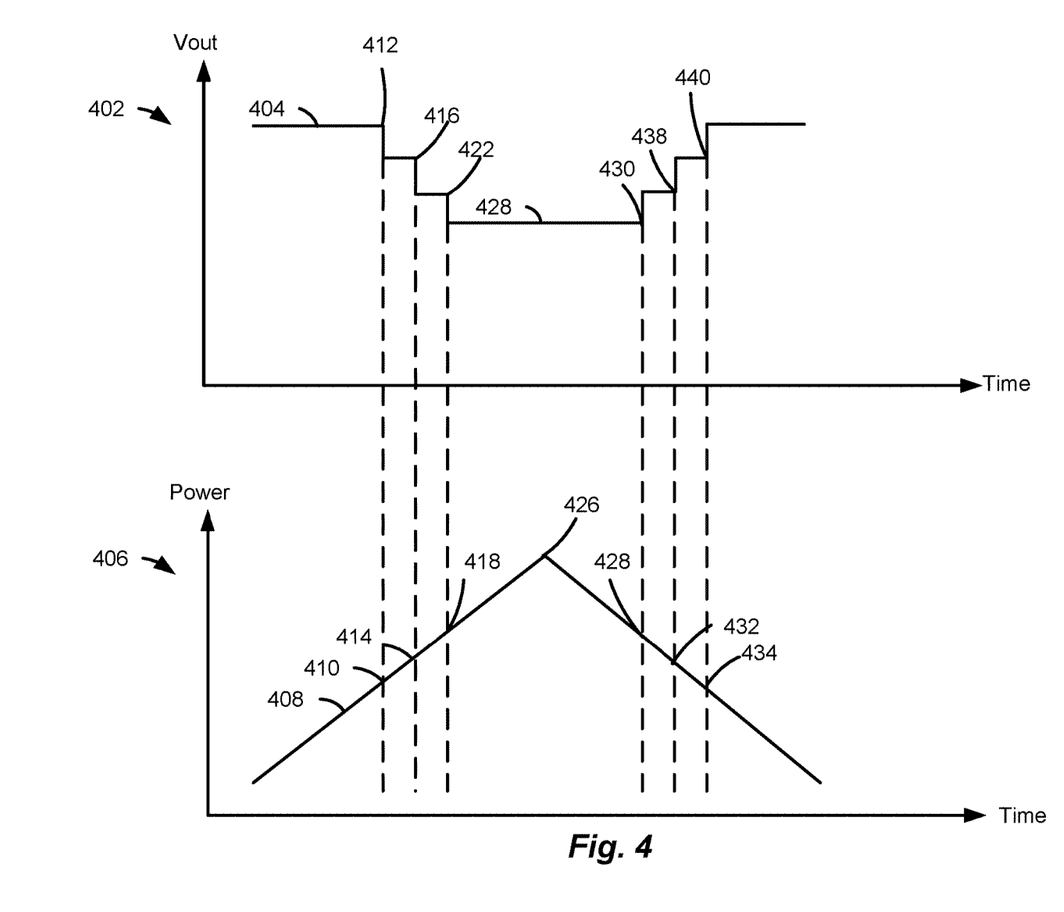
FIG. 4 shows an example of the output voltage and power over time according to one embodiment.

The above example showed a simple example of increasing and decreasing the output voltage. In operation, the output voltage Vout of regulator 104 may be increased and decreased multiple times. FIG. 4 shows an example of the output voltage Vout and power over time according to one embodiment. In a graph 402, the output voltage Vout is shown at 404. Also, in a graph 406, the power at 408 is shown over time.

At a point 410, the monitored power has increased above threshold S1. Then, at 412, the output voltage is lowered by an increment. At 414, the power may be still above threshold S1 and the output voltage is again lowered at 416. In one embodiment, every clock cycle, sensor logic 110 may check whether the power is above the threshold or has met the threshold S1. In other embodiments, the power must go below the threshold again and then meet the threshold again for the output voltage to be lowered again. Continuing, at 418, the power is above the threshold S1 and at 422, and the output voltage of regulator 104 is lowered again. The scenario may occur where a subsystem is performing some task and is the load current is constantly increasing, which causes the current through an inductor of regulator 104 to constantly increase. This causes the monitored power to dip below threshold S1 every time the output voltage Vout is lowered, but then increase above the threshold S1 as the current continues to increase.

At some point, the subsystem may finish the task and the load current goes down. At 426, the monitored power starts to decline and the power does not meet the threshold S1. In this case, the output voltage is not increased or decreased. As discussed above, the output voltage Vout of regulator 104 is not increased until the power goes below the threshold S2. This may occur at a point 428. Then, at 430, the output voltage is increased by an increment. This continues at 432 and 434 as the output power goes above and then below the threshold S2. Thus, when checked at multiple clock cycles, the output power still meets the threshold S2. This corresponds to the points 438 and 440 where the output voltage is increased to a maximum voltage level.

Even though the power as shown at graph 406 is increasing while the output voltage is lowered and decreasing while the output power is increased, when the power is increasing, decreasing of the output voltage allows more input current to be provided to regulator 104 and thus regulator 104 can provide more output current to subsystems 106. This can be explained by examining the power at the input and the output of regulator 104. For example, the input power Pi to regulator 104 is equal to the output power Po of regulator 104 with the efficiency (eff) of the regulator applied. With efficiency equal to 1, $P_i=P_o$. Considering the efficiency, with losses power may be equal to $P_i*eff=P_o=V_i*I_i*eff=V_o*I_o$, wherein eff is 0 to 1. That is, the input voltage times the input current and some efficiency of regulator 104 is equal to the output voltage times the output current. Thus, when the output voltage Vout is lowered, this lowers the input power required. If the input current is increasing and the input voltage stays the same, the power being used is increased because input current multiplied by the same input voltage increases the power used. Lowering the output voltage of regulator 104 thus provides more available power as the input voltage is also lowered allowing the increase in input current. That is, the increase in input current and decrease in input voltage may keep the input power used the same or around the same depending on the variation in input current and input voltage. Thus, in graph 406, as power is increasing, the output voltage Vout is continually lowered to provide more available power to regulator 104. Also, when the power being monitored is lowered, the output voltage Vout may be increased such that there is less available power.

In one example, the monitored power may be the input current to regulator 104, which may be monitored through an inductor of regulator 104. As the input current increases and input voltage stays the same, using the above formulae, the power being used goes up because the increased input current multiplied by the same input voltage increases the power used. By lowering the output voltage Vout, the input voltage may be lowered, thus providing more available current to regulator 104.

The priorities of subsystems 106 may be used to determine the maximum and minimum output voltage levels for regulator 104. For example, the maximum and minimum voltages may be determined dynamically based on the priorities of subsystems 106 that are requesting a power supply voltage from regulators 104.

Figure 5:
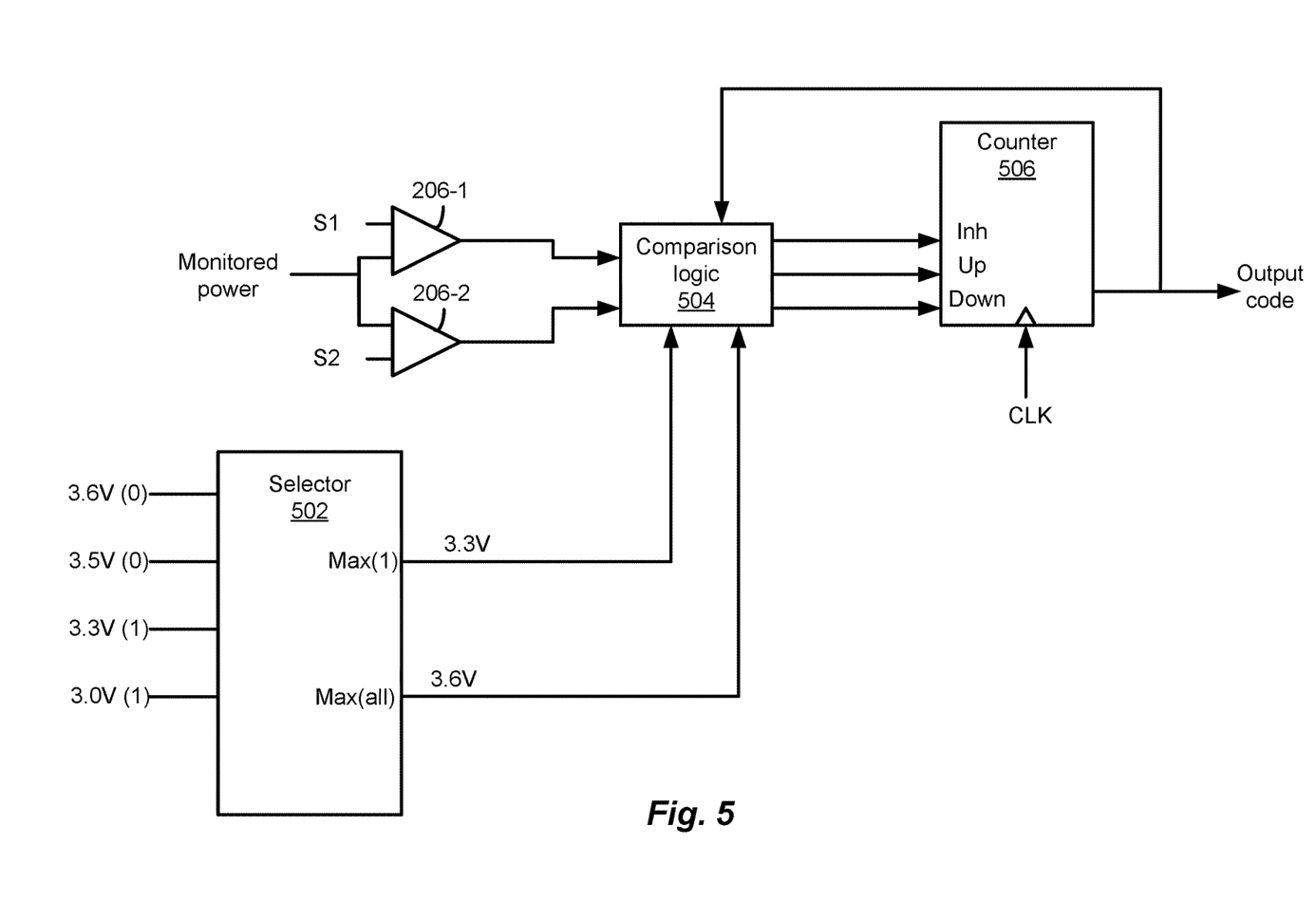
FIG. 5 depicts a system for using the priorities to select the maximum and minimum power supply voltage levels for the regulator according to one embodiment.

FIG. 5 depicts a system for using the priorities to select the maximum and minimum power supply voltage levels for regulator 104 according to one embodiment. It is noted that components of the system may be implemented in digital or analog circuits, or via software. In one example, a selector 502 receives requests from subsystems 106 for a power supply voltage, such as when the subsystems are operating. In other embodiments, the inputs are based on all subsystems that are present in the system and may need a power supply voltage. Selector 502 also receives power supply voltage operating requirements from subsystems 106. For example, at this point in time, the power supply voltages of 3.6V, 3.4V, 3.3V, and 3.0V are the minimum operating voltages for the subsystems that are currently active. It should be noted that these requests may change over the operation of the electronic device. Different priorities may also be associated with the requested voltages. For example, 3.6V and 3.4V are associated with subsystems 106 with a priority level of 0 and requested voltages 3.3V and 3.0V are associated with subsystems 106 with a priority level of 1. As discussed above, the priority 0 subsystems are subsystems in which a power supply voltage lower than the requested power supply voltage may be provided, where lower performance of that subsystem may be tolerated. However, the priority 1 subsystems should have their requested power supply voltage request provided.

Selector 502 then determines the minimum and maximum power supply voltage levels according to the priorities and the minimum operating voltages. For example, selector 502 takes a maximum of all of the priority 1 requests to determine the minimum power supply voltage. This determines the minimum amount of power supply voltage that is needed to supply to the priority 1 devices. In this case, 3.3V is selected for threshold S2. Also, selector 502 takes the maximum of all of the requested power supply voltages to determine the maximum power supply voltage. This is the highest minimum operating voltage that has been requested from all of the subsystems. In this case, a voltage of 3.6V is selected for maximum power supply voltage. It should be noted that the priority 2 device's minimum operating level may be above the maximum of the priority 1 device's minimum operating level. The maximum of the priority 2 minimum operating levels may be taken when this occurs.

The output of selector 502 provides the maximum power supply voltage and the minimum power supply voltage levels. Comparison logic 504 uses this information to determine whether the output voltage has hit the maximum power supply voltage or minimum power supply voltage levels. For example, comparators 206-1 and 206-2 receive the monitored power as discussed above from sensor 204, and compare the power to the thresholds S1 and S2. Comparators 206-1 and 206-2 output a signal to comparison logic 504 based on the comparison. If the output voltage has reached the maximum of the priority 1 minimum operating voltages that are being requested, then the output voltage cannot be lowered any more, and thus an inhibit (inh) signal is output. Also, if the output voltage has reached the maximum of the all the minimum operating voltages that are requested, then the output voltage cannot be increased any more, and thus an inhibit signal is output. If the maximum or minimum output voltage level has not been reached, then comparison 504 increases or decreases the output voltage depending on what threshold is met.

When comparison logic 504 determines that the output voltage should be increased, comparison logic 504 outputs an up signal to counter 506. Counter 506 counts up when this occurs. Counter 506 may then output a signal with an output code that increases the output voltage. The counter value is then provided back to comparison logic 504 such that comparison logic 504 can keep track of how many increases of the output voltage occur to determine whether or not the output voltage can be increased again. When comparison logic 504 determines that the output voltage should be decreased, comparison logic 504 outputs a down signal to counter 506. Counter 506 counts down when this occurs. Counter 506 may then output a signal with an output code that decreases the output voltage. The counter value is then provided back to comparison logic 504 such that comparison logic 504 can keep track of how many decreases of the output voltage occur to determine whether or not the output voltage can be decreased again.

When an output voltage level is reached, then comparison logic 504 outputs an inhibit signal. That is, when the minimum voltage is reached, comparison logic 504 does not decrease the power supply voltage anymore and when the maximum voltage is reached, comparison logic 504 does not increase the power supply voltage anymore. The above process may be performed every clock cycle, CLK, to output the output code.

Figure 6:
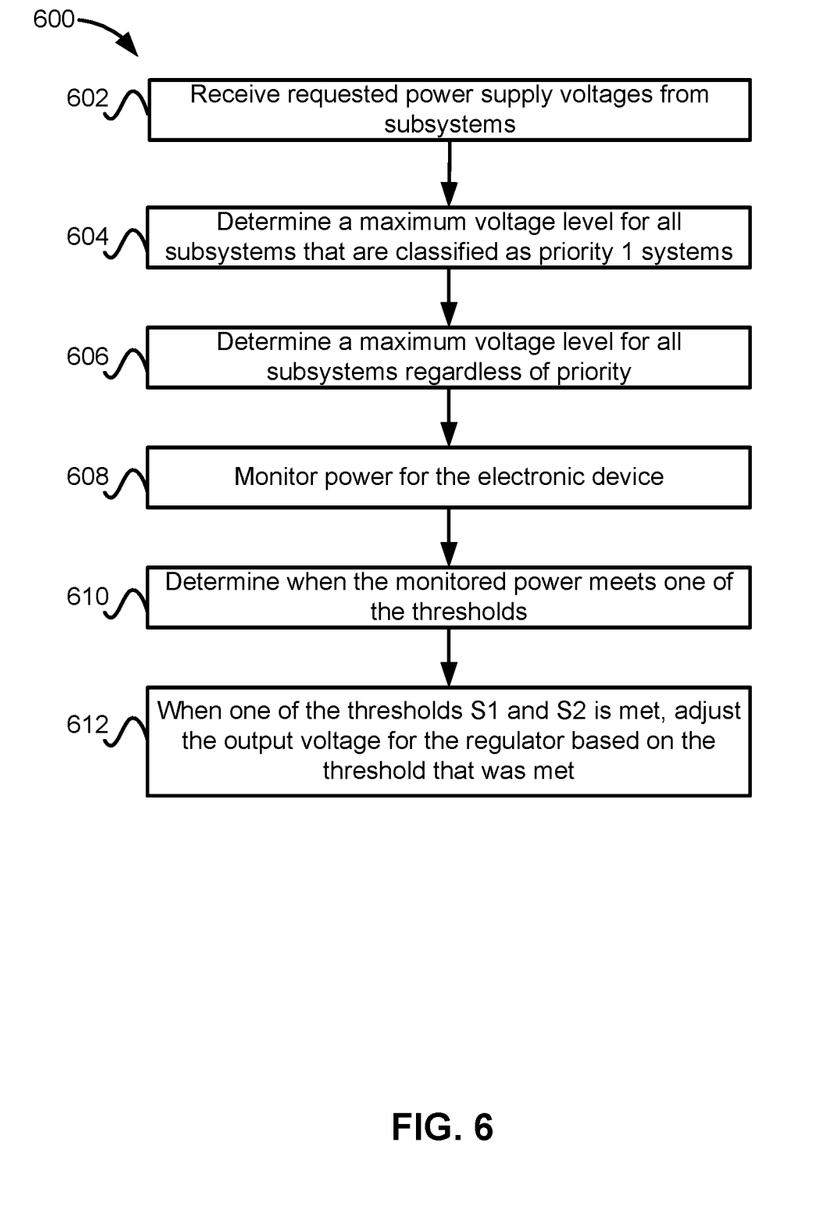
FIG. 6 depicts a simplified flowchart of a method for adjusting the output voltage of the regulator according to one embodiment.

FIG. 6 depicts a simplified flowchart 600 of a method for adjusting the output voltage of regulator 104 according to one embodiment. At 602, sensor logic 110 receives requested power supply voltages from subsystems 106. The requested power supply voltages may be received based on current activity for each subsystem 106. In other embodiments, the requested voltages may be preset and not change.

At 604, sensor logic 110 determines a maximum voltage level for all subsystems that are classified as priority 1 systems. This provides the minimum output voltage level for regulator 104. At 606, sensor logic 110 determines a maximum voltage level for the subsystems regardless of priority. This provides the maximum output voltage level for regulator 104.

At 608, sensor logic 110 monitors power for the electronic device. As discussed above, the monitored power may be detected from different areas of the electronic device that are associated with system 100, such as the input current of regulator 104, the current of battery 102, the voltage of battery 102, the current or voltage of external subsystems 108, or the output current or output voltage of regulator 104.

At 610, sensor logic 110 determines when the monitored power meets one of the thresholds. For example, the first threshold and the second threshold may be met.

At 610, when one of the thresholds S1 and S2 is met, Vout control logic 112 adjusts the output voltage for regulator 104 based on the threshold that was met. The adjusting may be performed as discussed above.

Accordingly, particular embodiments provide a system that can de-rate the output voltage of regulator 104 based on thresholds that may be below an absolute limit threshold in which operation of system 100 may be adversely affected. The meeting of one of the thresholds increments or decrements the output voltage of regulator 104 by one step. The minimum and maximum output voltages that can be provided is determined based on a priority associated with subsystems 106 that are requesting voltages from regulator 104.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A system comprising:
   a regulator configured to receive an input voltage and output an output voltage to a plurality of subsystems, wherein the plurality of subsystems comprise at least one first subsystem with a first priority level and at least one second subsystem with a second priority level; and
   sensor logic configured to:
   monitor a power of the system;
   generate a minimum output voltage level from the regulator based at least in part on minimum operating voltages of the at least one first subsystem of the first priority level;
   compare the power to a threshold; and
   decrease the output voltage of the regulator based at least in part on the power becoming equal to or greater than the threshold, wherein the output voltage is not decreased to be lower than the minimum output voltage level.

2. The system of claim 1, wherein:
   the threshold comprises a first threshold, and
   the sensor logic is further configured to:
   generate a maximum output voltage level from the regulator based on the minimum operating voltages from the at least one first subsystem and the at least one second subsystem; and
   determine when to increase the output voltage of the regulator based on the power becoming equal to or less than a second threshold, wherein the output voltage is not increased to be higher than the maximum output voltage level.

3. The system of claim 1, wherein the minimum output voltage level from the regulator is equal to or above a minimum operating voltage from the at least one first subsystem of the first priority level.

4. The system of claim 3, wherein the minimum output voltage level is equal to or above a maximum of the minimum operating voltages of the at least one first subsystem of the first priority level.

5. The system of claim 1, wherein the power is monitored at an input or an output of the regulator.

6. The system of claim 1, wherein the power is monitored from a battery providing the input voltage.

7. The system of claim 6, wherein the power is monitored from a current or a voltage from the battery.

8. The system of claim 1, wherein the power is monitored from an external subsystem separate from the plurality of subsystems, the external subsystem not receiving the output voltage from the regulator.

9. The system of claim 1, wherein the sensor logic is further configured to decrease the output voltage of the regulator by an increment when the power becomes equal to or greater than the threshold.

10. The system of claim 9, wherein:
the threshold comprises a first threshold, and
the sensor logic is further configured to increase the output voltage of the regulator by the increment when the power becomes equal to or less than a second threshold.

11. The system of claim 10, wherein the sensor logic is further configured to send a signal indicating an absolute limit has been met when the power becomes equal to or greater than a third threshold that is higher than the first threshold and the second threshold.

12. The system of claim 10, wherein:
when the power becomes equal to or greater than the first threshold, the sensor logic is further configured to check whether the minimum output voltage level has been reached and not decrease the output voltage when the output voltage is already at the minimum output voltage level; and
when the power becomes equal to or less than the second threshold, the sensor logic is further configured to check whether a maximum output voltage level has been reached and not increase the output voltage when the output voltage is already at the maximum output voltage level.

13. The system of claim 1, wherein the output voltage of the regulator is lowered below a minimum operating voltage from the at least one second subsystem that has the second priority level, but not below a minimum operating voltage from the at least one first subsystem that has the first priority level.

14. A method of generating regulated voltages in a system including a regulator, the method comprising:
receiving an input voltage and outputting an output voltage to a plurality of subsystems, wherein the plurality of subsystems comprise at least one first subsystem with a first priority level and at least one second subsystem with a second priority level;
monitoring power of the system;
generating a minimum output voltage level for the regulator based at least in part on minimum operating voltages of the at least one first subsystem of the first priority level;
comparing the power to a threshold; and
decreasing the output voltage of the regulator based at least in part on the power becoming equal to or greater than the threshold, wherein the output voltage is not decreased to be lower than the minimum output voltage level.

15. The method of claim 14, wherein the threshold comprises a first threshold, the method further comprising:
generating a maximum output voltage level for the regulator based on minimum operating voltages from the at least one first subsystem and the at least one second subsystem; and
determining when to increase the output voltage of the regulator based on the power becoming equal to or less than a second threshold, wherein the output voltage is not increased to be higher than the maximum output voltage level.

16. The method of claim 14, wherein the minimum output voltage level from the regulator is equal to or above a minimum operating voltage from one of the at least one first subsystem of the first priority level.

17. The method of claim 14, wherein the threshold comprises a first threshold, the method further comprising:
when the power becomes equal to or above the threshold, decreasing the output voltage of the regulator by an increment; and
when the power becomes equal to or below a second threshold, increasing the output voltage of the regulator by the increment.

18. The method of claim 17, further comprising:
when the power becomes equal to or above a third threshold that is higher than the first threshold and the second threshold, sending a signal indicating an absolute limit has been met.

19. A system comprising:
means for receiving an input voltage and output an output voltage to a plurality of subsystems, wherein the plurality of subsystems comprise at least one first subsystem with a first priority level and at least one second subsystem with a second priority level;
means for monitoring power of the system;
means for generating a minimum output voltage level from a regulator based at least in part on minimum operating voltages of the at least one first subsystem of the first priority level;
means for comparing the power to a threshold; and
means for decreasing the output voltage of the regulator based at least in part on the power becoming equal to or greater than the threshold, wherein the output voltage is not decreased to be lower than the minimum output voltage level.

* * * * *